(No Model.)
C. F. BATT.
HOISTING PULLEY.
No. 278,078. Patented May 22. 1883.
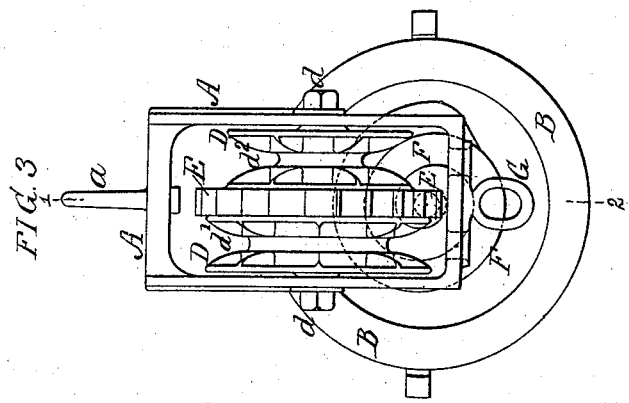
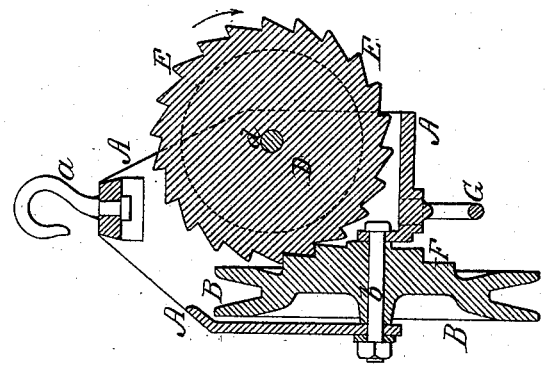
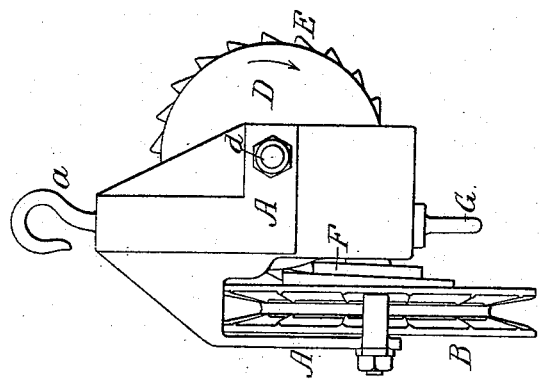
WITNESSES:
Harry Drury
Harry L. Ashenfelter
INVENTOR:
Charles F. Batt
by his Attys.
Howson and Sons

UNITED STATES PATENT OFFICE.

CHARLES F. BATT, OF SCHUYLKILL, CHESTER COUNTY, PENNSYLVANIA.

HOISTING-PULLEY.

SPECIFICATION forming part of Letters Patent No. 278,078, dated May 22, 1883.

Application filed April 2, 1883. (No model.)

*To all whom it may concern:*

Be it known that I, CHARLES F. BATT, a citizen of the United States, residing at Schuylkill Township, Chester county, Pennsylvania, have invented certain Improvements in Hoisting-Pulleys, of which the following is a specification.

The object of my invention is to construct a powerful self-locking hoisting-tackle; and this object I attain by combining with the chain-pulley of the hoisting apparatus a ratchet-wheel secured to or forming part of or gearing with the said chain-pulley and operated by a snail driven by or secured to or forming part of the pulley or wheel to which power is applied, as more fully described hereinafter.

In the accompanying drawings, Figure 1 is a side view of a pulley-block embodying my invention in one of its simplest forms; Fig 2, a section on the line 1 2, Fig. 3; and Fig. 3, a front view of the same.

A is the frame of the pulley-block, provided with the usual swiveled suspension-hook, $a$, and on a spindle, $b$, in this frame is mounted the wheel or pulley B, to which power is to be applied.

On a spindle, $d$, at right angles to the axis of the wheel B, is mounted the pulley D, over which passes the hoisting-chain. In the present instance I have shown this pulley, by preference, as a pulley having two chain-grooves, $d'$ $d^2$, of different diameters. With this chain-pulley D, I combine a ratchet-wheel, E, preferably cast in one piece with and in the center of the differential pulley, so as to be in line with the axis of the wheel B, on which is formed, or to which is secured, a snail, F, to act on the teeth of the ratchet-wheel. The axis of the snail and the ratchet-wheel preferably bear such a relation to each other, and the snail and wheel are so proportioned, that two of the teeth of the ratchet-wheel at all times bear on two of the cam faces of the snail, as shown in Figs. 1 and 2. On applying power to the wheel B in the direction of the arrow, Fig. 3, the ratchet-wheel E and pulley D will be rotated in the direction of the arrows, Figs. 1 and 2, to raise the load by means of the hoisting-chain passing over the pulley D; or the load may be lowered by reversing the motion of the wheel B, and the load may be retained at any point in its ascent or descent by simply ceasing to turn the snail, for the gear is self-locking, since the ratchet cannot turn the snail.

The hoisting-chain may be applied to the pulley D in various ways, either having it in the form of an endless chain passing over the two chain-grooves $d'$ $d^2$ and over a suspended pulley-block below, or by connecting one end of the chain to a loop or hook, G, on the frame of the tackle and then passing the chain either over the large or small diameter of the wheel D, or both, as the weight of the load and required speed of the hoisting may require.

Instead of securing the snail F to the power-wheel B, the snail may be mounted on a separate axis and geared to said wheel, and in the same way the ratchet-wheel E may be geared to the chain-pulley D, instead of being secured thereto. The wheel D, instead of being in the form of a pulley, may be in the form of a drum, on which the hoisting-chain can be coiled or uncoiled, as will be readily understood.

I claim as my invention—

1. The combination of the chain-wheel, pulley, or drum of a hoisting apparatus with a ratchet-wheel secured or geared thereto, and a snail gearing into said ratchet, and to which power may be applied, substantially as described.

2. The combination of a chain-pulley of a hoisting-tackle and ratchet-wheel secured to the pulley, with a snail gearing into said ratchet, and a driving wheel or pulley, B, operating said snail, substantially as set forth.

3. The combination of a differential hoisting-pulley having a ratchet-wheel between its chain-grooves, with a snail gearing into said ratchet, substantially as described.

4. The combination of a differential hoisting-pulley having a ratchet-wheel secured thereto, and a driving wheel or pulley having a snail secured thereto and gearing into said ratchet-wheel.

In testimony whereof I have signed my name to this specification in the presence of two subscribing witnesses.

CHARLES F. BATT.

Witnesses:
HARRY. L ASHENFELTER,
HENRY HOWSON, Jr.